Nov. 11, 1930.   E. H. SHAFF   1,781,130
PRESSURE FLUID MOTOR
Filed Oct. 13, 1924   3 Sheets-Sheet 1

Inventor:
Ernest H. Shaff,

Nov. 11, 1930. E. H. SHAFF 1,781,130
PRESSURE FLUID MOTOR
Filed Oct. 13, 1924 3 Sheets-Sheet 3
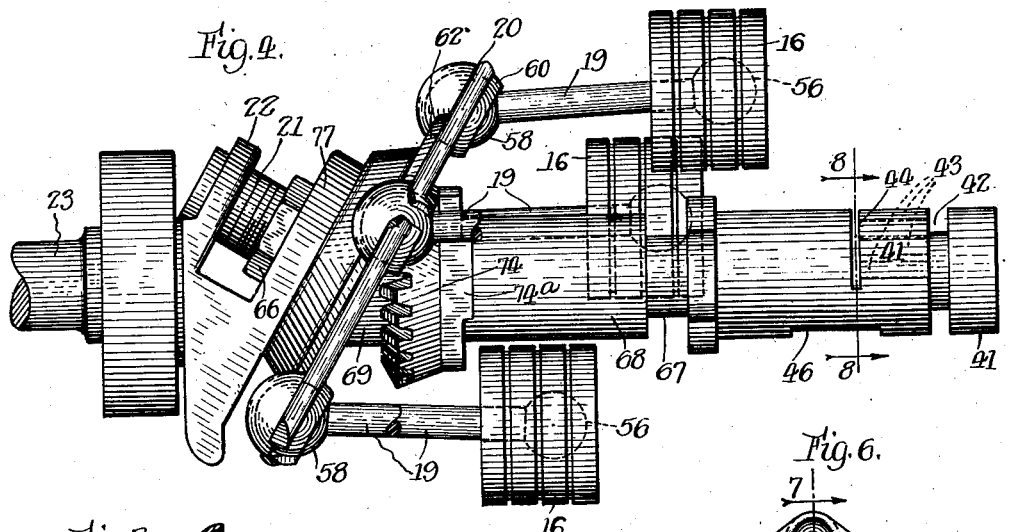
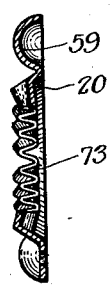
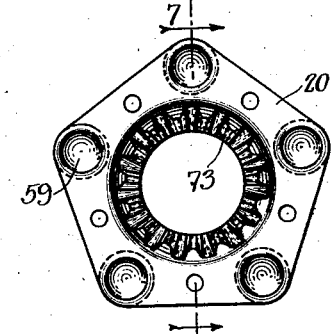
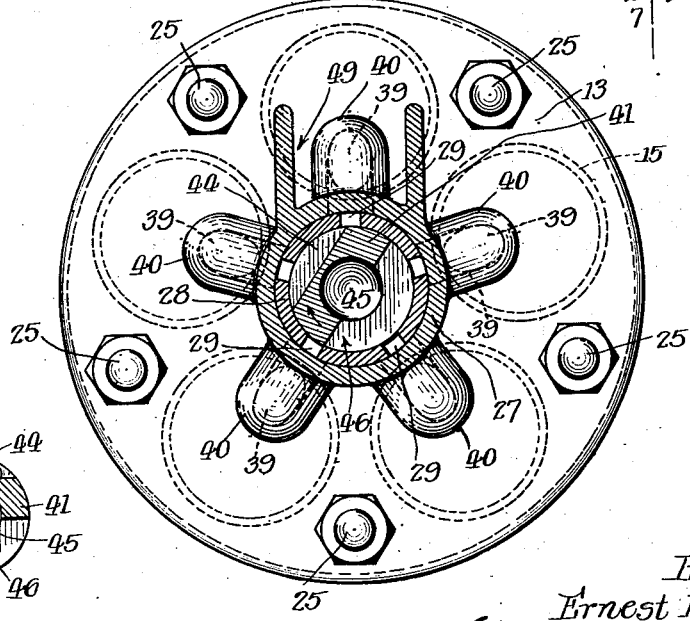
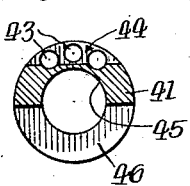
Inventor:
Ernest H. Shaff,
Attys.

Patented Nov. 11, 1930

1,781,130

UNITED STATES PATENT OFFICE

ERNEST H. SHAFF, OF GRAND HAVEN, MICHIGAN, ASSIGNOR TO WM. H. KELLER, INC., OF GRAND HAVEN, MICHIGAN, A CORPORATION OF MICHIGAN

PRESSURE-FLUID MOTOR

Application filed October 13, 1924. Serial No. 743,205.

The invention has general reference to a pressure fluid operated motor of the type in which the motive fluid is utilized to impart a rotational movement to the shaft or spindle of a portable tool.

Pressure fluid motors of the rotary type have been the subject of considerable effort in an attempt to produce a motor adapted for portable tools and capable of withstanding long and hard usage. As a result, rotary pneumatic motors of various forms have been produced, some of which embody an ordinary crank shaft for converting reciprocatory motion into rotary motion; while others have embodied two coacting members inclined with respect to the direction of the reciprocatory movement and sliding relative to each other. The former or crank type is in many instances objectionable for the reason that it must necessarily occupy a substantial amount of space because of its cumbersome character. Also, in this type, considerable side pressure of the pistons on the cylinder walls results from the fact that the connecting rod must swing sidewise a distance equal to the length of the stroke. The other type has proven objectionable because of the excessive amount of friction developed between the sliding parts. To overcome these disadvantages of the two types referred to, while obtaining efficiency in power transmission, with compactness of the parts, is the primary object of my invention.

Among the salient features of my improved motor is the use of a plurality of bell-cranks arranged in circular series so as to be successively actuated by a series of motor units correspondingly arranged. Another feature of importance is the utilization of a single crank pin as a lever arm common to each of the bell-cranks of the rotary series. Said pin has associated therewith on the one hand a plate disposed perpendicularly to the axis of the pin and inclined relative to the direction of reciprocation produced by the several motor units; whereby, by the successive application of power by said units to spaced points in the periphery of the plate, the pin is given a gyratory motion. On the other hand the pin is connected to a crank arm upon a tool spindle or other shaft so that the gyratory motion of the pin results in a rotation of the shaft.

A general object of the invention is to produce a construction for the motor, which is of a thoroughly practical character capable of being manufactured at a relatively low cost and yet strong and durable in character.

In the accompanying drawings I have shown my invention as applied to a portable grinding tool but it will be understood that the invention is not limited to portable tools but is susceptible of general application. Also it is contemplated that various changes in the construction and arrangement of the parts illustrated and hereinafter fully described may be varied by those skilled in the art without departing from the spirit and scope of the invention as expressed in the appended claims.

Figure 1 of the drawings is a longitudinal central sectional view through a portable grinder embodying my invention.

Fig. 1ª is a perspective view illustrating the operation of the power transmission employed.

Figs. 2 and 3 are transverse sectional views on enlarged scales taken approximately in the planes of lines 2—2 and 3—3 respectively of Fig. 1.

Fig. 4 is a view of the major portion of the power transmission detached from the motor casing.

Fig. 5 is a transverse sectional view on an enlarged scale taken approximately in the plane of line 5—5 of Fig. 1.

Fig. 6 is a rear view of the crank plate detached and illustrating its construction.

Fig. 7 is a sectional view through the plate taken in the plane of line 7—7 of Fig. 6.

Fig. 8 is a sectional view through the valve member taken in the plane of line 8—8 of Fig. 4.

General description

Figure 1:
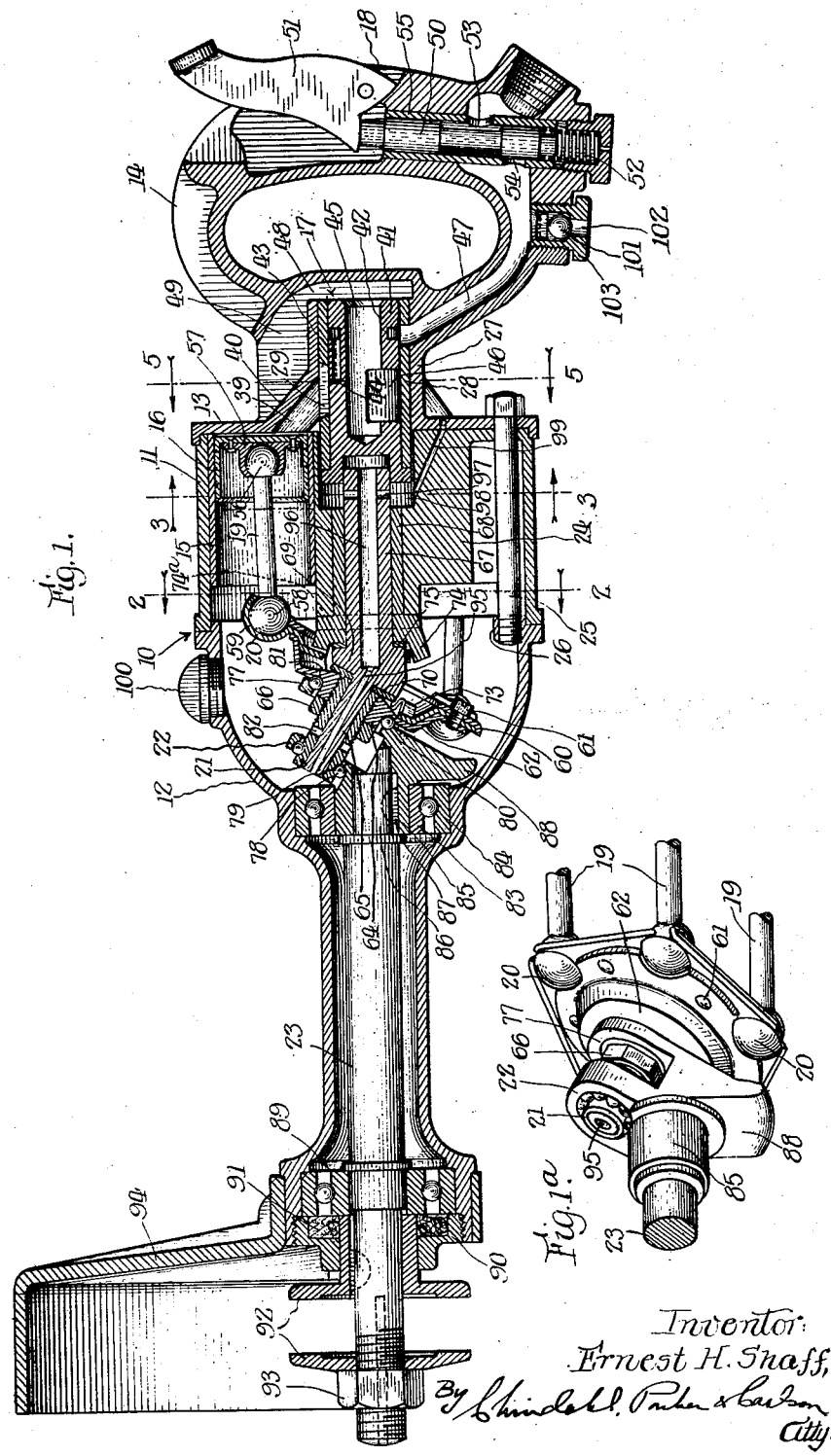

Referring first to Fig. 1 of the drawings, 10 designates the annular casing of a portable grinder comprising a main or rear section 11 and a front section 12. The rear section is closed by means of a plate 13 with which is rigid a handle 14. Within the rear or main section of the casing is a plurality of motor units arranged in circular series and each comprising a cylinder 15 and a piston 16. The flow of fluid pressure to and from these several motor units is controlled by an automatically operating valve mechanism generally designated by the numeral 17, and by a manually operable valve in the handle generally designated by the numeral 18. Power impulses imparted to the pistons of the several motor units are successively transmitted by piston rods 19 to a plurality of bell-cranks arranged in circular series and formed by a crank plate 20 and a crank pin 21, said pin constituting in effect an arm common to each of the series of bell-cranks, the other arms being embodied in the plate 20. The crank pin is connected to a crank arm 22 rigid with the tool spindle 23, which is journaled in the forward section 12 of the casing, and the plate 20 has a sliding bearing near its center on a plate rigid with the arm 22 and providing in effect a shifting fulcrum, continuously moving with the crank pin, for each of the bell-cranks.

The invention in detail

The main or rear section 11 of the tool casing is annular in form, and in the present instance is cast to form integral therewith a cylinder block 24 which is bored to receive sleeves forming a circular series of cylinders 15. The pistons 16 are cup-shaped in form but may be of any suitable or preferred construction.

Figure 3:
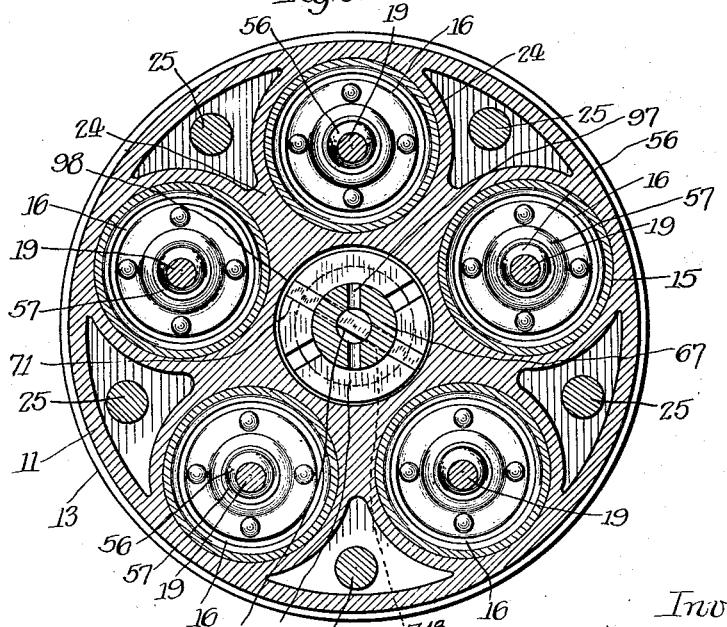

The forward section 12 of the tool casing is bell-shaped at its rear end and is shaped at this end to interengage with the forward end of the main casing 11. The two sections are secured together by means of a series of bolts 25 entered through the rear plate 13 and between the adjacent cylinder blocks (Fig. 3), their forward ends being anchored in lugs 26 formed integral with the casing section 12. The bolts 25 also serve to secure the rear plate 13 in place.

Formed integral with the rear plate 13 of the casing is a rearwardly extending tubular portion 27 constituting a hub for the valve mechanism 17 and providing a support to which the handle 14 may be secured, the handle being in this instance shown as formed integral with the portion 27.

The valve mechanism 17 which I by preference employ comprises a stationary casing 28 having a series of circumferentially arranged slots forming ports 29 which communicate with passages 39 formed in enlargements 40 integral with the plate 13 (Figs. 1 and 5). The passages 39 are inclined forwardly and outwardly and at their forward ends open into the rear ends of the cylinders 15. Within the valve casing 28 is a rotary valve member 41 having at its rear end an annular groove 42 from which a plurality of port holes 43 (Figs. 1 and 8) extend forwardly and terminate in a transverse slot 44 formed on the periphery of the valve member and positioned approximately centrally thereof so as to register successively with the ports 29. The valve member also has a central bore 45 opening at its forward end into a transverse slot 46 located diametrically opposite the slot 44 and also adapted to register successively with the ports 29. The annular groove 42 (Fig. 1) communicates at all times with a passage 47 in the handle to which motive fluid is supplied under the control of the manually operable valve 18; so that in the rotation of the valve member, pressure is admitted successively to the circular series of ports 29 by way of the holes or ducts 43 and the transverse slot 44. On the other hand the bore 45 communicates at its rear end with an exhaust passage 48 extending radially outwardly into an exhaust chamber 49 which is open to the atmosphere; so that as the slot 46 registers successively with the ports 29 communication is established between the cylinders and the atmosphere.

The manually operable valve herein shown is of ordinary construction so that it is deemed unnecessary to describe it in detail. It comprises generally a valve member 50 which is operable by a lever 51 against the action of a spring 52 to control the passage of motive fluid through ports 53 and 54 in a valve casing 55, the port 53 being in communication with a source of motive fluid supply and the port 54 with the passage 47.

Figure 2:
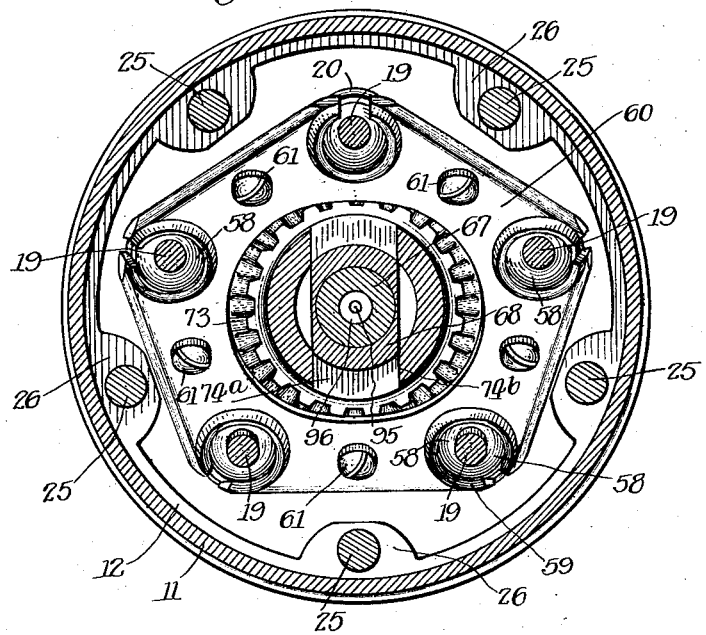

The piston rods 19 connect the pistons 16 with the crank plate 20 so that power impulses produced by the several motor units are transmitted to the plate 20 to impart a gyratory motion to the crank pin 21 as hereinafter more fully described. The rods 19 are herein shown as connected at their rear ends to the pistons by means of balls 56 and socket members 57 secured as by means of rivets to the rear end walls of the pistons. The forward ends of the rods are secured to the plate 20 by means of balls 58 seated in sockets 59 formed in spaced relation about the periphery of the plate 20, and secured in said sockets by means of a retaining plate 60 (Fig. 2).

The plate 60 is secured upon the rear face of the plate 20 as by means of screws 61.

The plate 20 is made rigid with the crank pin 21 by securing it upon a bearing plate 62 having a central hub 64 which is in turn rigid with the pin. Herein the hub portion 64 is shown as screw-threaded upon the pin 21, the two parts being secured by means of a lock nut 66.

For the purpose of rotating the valve member 41, the crank pin 21 is in the present instance drilled axially thereof to receive an inclined stem 65 formed integral with a shaft 67 disposed axially of the casing and journaled in a sleeve 68 which in turn is mounted in the cylinder block. Said shaft has at its forward end a head 69 having an inclined face from which the stem 65 projects. A hardened thrust washer 70 has a bearing on said inclined face and in turn provides a bearing for the sleeve 65 and the hub portion 64 of the plate 62. The opposite end of the shaft 67 has a clutch connection with the forward end of the valve member 41. Said clutch connection in the present instance comprises registering slots 71 and 71ª in the rear end of the shaft 67 and in the forward end of the valve member, and a key 72 adapted to enter into said slots. I have shown two pairs of slots 71ª in the valve member so arranged as to change the relative positions of the valve depending upon the direction of rotation desired.

The crank plate 20 is operated upon by the several motor units to effect a wabbling motion which is transmitted to the crank pin to cause it to gyrate in a path such that it describes in effect a cone having its apex disposed coaxially of the shaft 67. To hold the plate 20 against rotation and at the same time permit of this wabbling motion, it is provided centrally thereof with a series of gear teeth 73 constituting a bevel pinion; and this gear meshes with a stationary gear 74 rigid with and in the present instance formed integral with the forward end of the stationary sleeve 68. The gear 74 has diametrically opposite clutch teeth 74ª (Figs. 2 and 4) which engage in grooves 74ᵇ in the forward end of the cylinder block to hold the gear against rotation. The gear 73 is in the present instance also formed integral with its plate 20, the latter being made of sheet metal and shaped near its center to form the teeth of said gear 73 as shown clearly in Fig. 6. A thrust washer 75 is interposed between the head 69 on the shaft 67 and the pinion 74.

The connection between the crank pin 21 and the shaft or spindle 23 whereby the circular or gyratory motion of the pin is transmitted to the spindle to rotate it will now be described. It comprises the crank arm 22 rigid with the spindle 23 at the rear end of the latter. Said arm is also inclined relative to the axis of the shaft 67 so as to lie perpendicular to the axis of the crank pin 21. Rigid with the arm 22 but spaced rearwardly therefrom is a bearing ring 77 which encircles the hub portion 64 of the plate 62. The arm 22 is apertured at its free end to receive the end of the crank pin, and radial thrust ball bearings 78 are interposed between the pin and the arm, the pin being provided with an annular groove 79 to form a race-way for the balls. Similarly, ball thrust bearings 80 are interposed between the ring member 77 and the plate 62, a ball race 81 being formed between the plate 62 and its hub portion 64. By this construction the crank arm 22 is free to revolve about the pin 21 as the latter describes its gyratory motion under the successive impulses of the pistons. 82 designates a pair of oil holes through the pin 21 to supply lubricant from the interior of the casing to the stem 65.

The crank arm 22 is rotatably mounted in the forward casing section 12 through the medium of a ball bearing having inner and outer race-ways 83 and 84 secured respectively to a hub portion 85 of the arm and to the casing 12. The hub portion is secured upon a reduced rear end portion 86 of the spindle as by means of a key 87. The arm 22 and ring member 77 are integrally connected by a part 88 formed diametrically opposite said members so as to effect a counterbalancing action thereon.

The casing section 12 where it encricles the spindle 23 is reduced in diameter to provide at one end a bearing for the rear end of the spindle 23 and at its forward end a bearing for the forward end of the spindle. The latter bearing is similar to that described in connection to the rear end. It is generally designated by the numeral 89. In the extreme forward end of the casing section 12 I provide a plug 90 between which and the bearing 89 is interposed a suitable packing material 91.

The forward end of the spindle is provided with a pair of clamping plates 92 between which a grinding wheel may be secured, the spindle being provided with a clamping nut 93 for this purpose. 94 designates a housing mounted on the forward end of the casing and serving partially to enclose the grinding wheel.

To permit of the escape from the interior of the casing of motive fluid leaking past the pistons into the casing, I provide a passage formed by a duct 95 in the stem 65 and extending longitudinally through the said stem and opening at its rear end into a bore 96 through the shaft 67. Radial ports 97 connect the rear end of the bore 96 with a chamber 98 which communicates with the atmosphere through a duct 99 in the cylinder block. The motive fluid in its passage serves to conduct heat from the parts.

100 is a plug screw-threaded into the forward casing section 12, which is removable to permit of the introduction of lubricant into the casing. 101 is a ball valve in the handle, seated on an air inlet port 102 in a fitting 103, to permit of the passage of air to the motor when the motive supply is cut off by the operator, thus enabling the motor to continue to operate under momentum.

The operation is as follows: Referring to Figs. 1, 4 and 5, and assuming the parts to be in the position shown, pressure fluid is admitted to the valve mechanism through the operation of the manually operable valve 18, and passes around the annular groove 42 through the ducts 43 to the slot 44. The valve member in the position assumed (Fig. 5) has previously established communication between the slot 44 and the port 29 leading to the upper left motor unit, and is commencing to uncover the port leading to the upper unit. Also the valve member is uncovering the port leading to the lower left unit and establishing communication between such unit and the exhaust slot 46. The upper and lower right units are also in communication with the exhaust slot 46 through the several ports 29. Accordingly the upper left unit has partially completed its power stroke (Fig. 4); the upper unit is just commencing its power stroke; the lower left unit is just commencing to exhaust and the other two units are also exhausting. It will thus be observed that there is an overlapping of power strokes of adjacent units such that when motive fluid is admitted to one unit to commence the power stroke the next preceding unit has performed only about one-half of its power stroke. Also it will be seen that ample opportunity is provided for each of the units to exhaust completely so that exhaust pressures need not in any way retard the operation.

It will be understood that the valve member 41 is rotated continuously through the operation of the stem 65 in the crank pin 21, to admit motive fluid to and from the motor units. I have found in practice that by making the inlet slot 44 in the valve member very narrow greatly increases the speed of operation of the tool with a lower consumption of motive fluid than when this slot is of large size. This result I attribute to the restriction of the air in its passage between the ducts 43 on the one hand and the port 29 and passage 39 on the other, producing in effect an increased velocity of the air and impact thereof against the pistons.

The impulses which are thus produced in rapid succession by the several motor units are transmitted by their respective pistons to the crank plate 20, which it will be remembered is held against relative rotary movement by the intermeshing gears 73 and 74. The crank plate, in turn bears upon the ring 77 through the thrust bearings 80. Thus, the latter provide, in effect a shifting fulcrum for the series of bell-crank levers, one arm of each of which is formed by the plate 20 and the other arm of which is formed by the crank pin 21. Accordingly each impulse imparted to the plate produces in the crank pin a swinging motion; and as such impulses occur in rapid succession about the periphery of the plate the swinging movements produced combine to impart a gyratory motion to the crank pin in which it describes a circular path defining in effect a cone having its apex coincident with the axis of the crank plate.

The gyratory motion thus imparted to the crank pin is transmitted to the crank arm 22 through the radial thrust ball bearings 78, with the result that rotary motion is produced in the spindle 23 which is rigid with the arm. Because the diameters of both bearings 78 and 80 are relatively small, their peripheral speeds are correspondingly small. This is of great importance as will be evident from the fact that these tools operate at a speed of about 3500 revolutions per minute.

It will be apparent that by the construction and arrangement which I have thus provided I have substantially eliminated the friction which is necessarily present in the prior motors of this general type in which the rotary motion is produced solely by a relative sliding motion between the wabbling member and an inclined plate rigid with or connected to the tool spindle. Thus I have obtained certain advantages in a tool of the type in which reciprocatory motion is converted into rotary motion through the medium of a crank shaft, and have not sacrificed compactness in construction. I have found in practice that the motor when constructed in accordance with my invention is substantially more durable than those of the sliding type above referred to.

Moreover, it will be seen that the construction employed is relatively simple; also that the sectional connection of the casing and the manner in which the several mechanisms are detachably secured together renders it possible readily to disassemble the tool for purposes of repair.

I claim is my invention:

1. A pressure fluid motor of the character described comprising, in combination, a crank arm, a wobbler comprising an inclined pressure plate and an axially projecting stem, said crank arm being apertured to receive said axial stem, and two sets of antifriction elements interposed between the crank arm and said axial stem with the elements of the respective sets disposed on opposite faces of said crank arm so as to hold the wobbler and crank against relative axial movement, said stem being adjustable axially relative to the plate to permit of the insertion or removal of the anti-friction elements.

2. A pressure fluid motor comprising, in combination, a crank arm, a wobbler comprising an inclined plate having an axial stem, said crank arm having a pair of spaced parallel members apertured to receive said stem, two sets of anti-friction elements interposed between said stem and said crank members with the elements of the respective sets disposed on opposite faces of the crank arm, said stem being screw-threaded in said plate so as to be adjustable in a direction axially of the plate to permit of the insertion or removal of the bearing elements, and a lock nut on the stem between the two crank members.

In testimony whereof, I have hereunto affixed my signature.

ERNEST H. SHAFF.